Oct. 14, 1958  G. KLAUS  2,855,823
APPARATUS FOR ENLARGING TRANSPARENT PICTURES
Filed Sept. 27, 1954
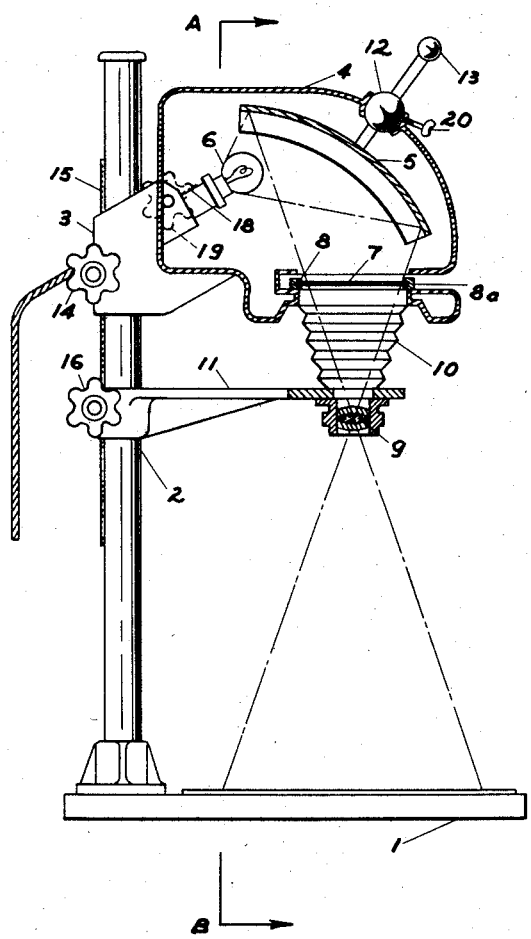
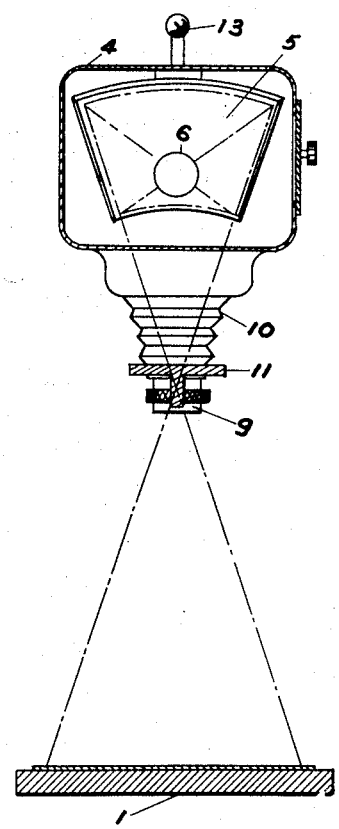
INVENTOR
GERHARD KLAUS
BY
ATTORNEYS

United States Patent Office 2,855,823
Patented Oct. 14, 1958

2,855,823

APPARATUS FOR ENLARGING TRANSPARENT PICTURES

Gerhard Klaus, Siegen, Westphalia, Germany, assignor to Firma Meteor Apparatebau Paul Schmeck G. m. b. H., Siegen, Westphalia, Germany Application September 27, 1954, Serial No. 458,581

Claims priority, application Germany October 9, 1953

5 Claims. (Cl. 88—24)

The invention relates to apparatus for enlarging transparent pictures such as films, photographic negatives and the like.

The invention relates more particularly to a new type of such apparatus.

In enlarging apparatus of the hitherto known kind, the rays of light are collected into one optical pencil by means of a condenser or double condenser lens arranged between the light source and the objective. If the negatives to be enlarged are relatively large, for instance in the order of 5 x 7 inch or 7 x 10 inches, the lenses of the condenser must also have a correspondingly large diameter. This requires very heavy and expensive lenses.

Furthermore the enlarging apparatus provided with a condenser lens system have the disadvantage of an uneven distribution of light, since the intensity of the light is always greater in the vicinity of the optical axis than nearer the margin of the picture. This fact is very disturbing at higher ratios of enlargement.

It is an object of the invention to avoid the aforesaid disadvantages.

It is thus an object of the invention to provide an enlarging apparatus having a substantially increased light intensity, and an even distribution of light over the whole enlarging area.

It is another object of the invention to provide an enlarging apparatus particularly suitable for enlarging large-size pictures, for instance in the order of 5 x 7" or of greater dimensions without requiring the use of heavy and expensive lenses.

It is a further object of the invention to provide an enlarging apparatus, wherein a detrimental effect of heat convection on the object for instance a photographic negative is substantially eliminated.

Yet another object of the invention is to provide an enlarging apparatus which is equally suitable for the enlargement of common photographic pictures as well as for the enlargement of microscopic objects mounted on slides or the like and for the projection of pictures on a screen.

The aforesaid objects are achieved according to the invention by an improved type of enlarging apparatus wherein the light coming from a light source of the common type is collected by means of a concave mirror of aspherical shape instead of the usual condenser lens system.

The concave mirror is so arranged in relation to the light source that the condensed light pencil reflected from said mirror passes through the object to be enlarged, for instance a photographic negative, and then enters the objective lens means from where it is projected with the desired enlargement onto a reproduction area, an easel, paper holder or the like. This arrangement makes it possible to omit the usual condenser system consisting of one or several lenses.

The aspherical concave mirror is preferably shaped and arranged in such a manner that the optical axis of the same does not coincide with the optical axis of the enlarging apparatus, the light source being mounted laterally and away from the optical axis. It is thus not mounted in the optical axis above the object to be enlarged as is usually the case in the known apparatus.

The curvature of the mirror may be chosen according to the desired kind of enlargement. The mirror may also possess several radii of curvature in vertical as well as horizontal section.

The arrangement according to the invention has the advantage that the path of the light reflected by the mirror is not interrupted or disturbed by the lamp socket or any other part holding the source of light.

In an enlarging apparatus according to the invention the maximum amount of the light from the light source is collected and reflected in the form of a pencil of light. The passage of light through all parts of the negative is of completely even intensity, the latter being substantially increased over the intensity of light derived from a condenser.

Another important advantage of this invention consists in that when replacing the objective lens system by a different one the adaptation of the apparatus to the new objective is carried out by a simple adjustment of the light source.

In the enlarging apparatus of the known types an exchange of the objective for a different one also required a replacement of the condenser lens system by another condenser adapted for use with the new objective.

Furthermore the enlarging apparatus according to the invention comprising an aspherical light-condensing mirror may be provided with usual auxiliary devices. Thus the mirror as well as the lamp representing the light source may be displaceable or rotatably mounted and may be adjustable either separately or with the object carrier. The objective in common may also be adjustable in known manner.

In the accompanying drawings one embodiment of an enlarging apparatus according to the invention is represented schematically by way of example.

Fig. 1 is a side view in partial cross section.

Fig. 2 is a cross section in Fig. 1 along line A—B of the apparatus casing.

Referring now to the drawings more in detail reference 1 indicates the base plate of the apparatus, 2 represents the usual standard. The arm 3 is mounted adjustably as to height and rotatably or angularly displaceable on the standard 2. The arm 3 bears the casing 4. In the embodiment represented in the drawings an aspherical mirror 5 is arranged inside the casing 4. This mirror receives light from a light source 6 which is arranged laterally in relation to the mirror 5 inside the casing 4 and toward the standard 2. The mirror 5 reflects the light received from the light source 6 and directs it to the object 7 to be enlarged. The object 7 may be mounted below the mirror 5 in a known manner for instance by inserting it in the slot or longitudinal opening 8 of the object carrier 8a. The image of the object 7 is enlarged by means of the objective 9 which consists of a lens or a system of lenses mounted at the lower end of the telescopical camera bellows 10. The latter is supported on the standard 2 and is displaceable and adjustable as to height.

In order to bring the mirror 5 into a position of advantageous relationship to the lamp 6, the mirror 5 may be adjustable by means of a ball joint 12 arranged in the upper wall of the casing 4. The adjustment of the mirror 5 takes place by moving the handle 13 of the ball joint 12 to any desired position and fastening the same therein by means of a screw 20 or the like. The adjustment of the casing 4 and the object carrier 8a may take place for instance by means of an adjusting knob 14 and a gear mounted on the same axis as the knob 14, which gear is not shown in the drawings. This gear engages a pawl 15 which is mounted on the standard 2. The adjustment of the position of the objective carrying arm 11 takes place in a similar manner by means of an adjusting knob and gear 16, the gear equally engaging the pawl 15.

The light source is equally displaceable and adjustable, for instance by advancing or retracting the lamp shaft 18 inside the socket 19 which is in turn mounted on to the wall of the casing 4.

All additional devices commonly used with such enlarging apparatus, such as switches, screens, and the like may of course be provided with the apparatus of my invention.

The aspherical mirror may be manufactured preferably from drawn copper sheet which is made highly reflecting by plating with silver or aluminum in high vacuum.

It is of importance in enlarging apparatus of the known types using condenser systems that the light source is of small dimensions. Overvoltage lamps of small shaft dimensions are, however, limited to a maximum efficiency of 250 watt, and are correspondingly short-lived.

The enlarging apparatus according to the invention, however, offers the advantage that due to the fact that a mirror is used instead of the condenser, the lamps may possess shafts of larger dimensions, permitting the use of overvoltage filaments of, for instance, 600 or 1000 watt. The lifetime of such a lamp is considerably longer than that of a small 250 watt lamp as used with the known condenser-type apparatus due to the greater lighting effect of the 600 watt or 1000 watt lamps used with the mirror-type apparatus. According to the invention a light intensity is obtained which exceeds by 20 to 50 percent that of the known condenser-type apparatus.

This is particularly important for the marginal areas of the picture which usually show a strong decline of intensity against the center in the known types of apparatus with condensers.

What I claim is:

1. An apparatus for enlarging transparent pictures or the like, said apparatus comprising a casing, an object carrier for supporting a transparent picture or the like, objective lens means, a camera bellows attached at one end thereof to said casing and extending in the direction of the optical axis of said objective lens means, the latter being attached to said camera bellows at the opposite end thereof, paper supporting means for supporting a paper or the like upon which the image of the transparent picture or the like is to be projected in a position wherein the paper or the like is intersected by said optical axis, a light source in said casing and spaced from said optical axis, and an aspherical light-condensing mirror arranged on that side of the transparent picture or the like which is opposite to the side on which said objective lens means is arranged, and being intersected by said optical axis, said mirror condensing light rays emitted from said light source to form a bundle of light, and directing said bundle of light directly toward the transparent picture or the like, said light source being so positioned as to be outside of said bundle of light directed by said mirror directly toward the transparent picture or the like, whereby light emitted from said light source is directed through the transparent picture or the like without the intermediary of a condenser lens system.

2. An apparatus according to claim 1 wherein the aspherical mirror comprises a reflecting surface possessing several radii of curvature in horizontal as well as vertical direction.

3. An apparatus according to claim 1 wherein means are provided for adjusting said mirror inside said casing in relation to said light source.

4. An apparatus according to claim 3 wherein said mirror adjusting means comprise a ball joint mounted on said casing and a fastening screw.

5. An apparatus according to claim 1 wherein means are provided for adjusting said light source inside said casing.

References Cited in the file of this patent

UNITED STATES PATENTS

| 1,235,484 | Jones | July 31, 1917 |
| 2,238,008 | Beck | Apr. 8, 1941 |
| 2,252,246 | Bergmans | Aug. 12, 1941 |
| 2,344,558 | Moore | Mar. 21, 1944 |
| 2,438,219 | Johnston | Mar. 23, 1948 |

FOREIGN PATENTS

| 343,890 | Italy | Oct. 17, 1936 |